2,771,461

PROCESS FOR COPOLYMERIZING ACRYLONITRILE AND ACRYLATE ESTERS

Harry H. Weinstock, Jr., Madison, N. J., assignor to Allied Chemical & Dye Corporation, New York, N. Y., a corporation of New York No Drawing. Application April 30, 1952,
Serial No. 285,310

5 Claims. (Cl. 260—85.5)

This invention is directed to an improvement in the processes for copolymerizing acrylonitrile with an ester of acrylic acid and a normal, aliphatic alcohol of the homologous series methyl alcohol through n-nonyl alcohol, in an aqueous reaction medium containing separate monomer phase dispersed in the aqueous phase, i. e. in aqueous emulsions or suspensions, in the presence of hydrogen peroxide as catalyst for the polymerization. The invention is of special importance in copolymerizing methyl acrylate and acrylonitrile. Conditions of temperature, dispersion of the monomers, catalyst, etc., under which the monomers are polymerized influence various properties of the polymers, including their molecular weights. The purpose of the invention is to provide a means for decreasing the molecular weight of the resulting polymers which acts independently of those reaction conditions.

Its molecular weight is an important polymer property. A body of polymer produced by reaction of monomeric compounds ordinarily does not consist, however, of material all having one and the same molecular weight. Rather it consists of materials of different molecular weights but of similar chemical composition. In speaking of the molecular weight of a polymer, therefore, this means the "average" molecular weight of the polymeric material.

The relative molecular weights of polymers may be ascertained by any one of several methods. One is based on determining the viscosities of solutions of the different polymers in a given solvent under standardized conditions. From this data the reduced viscosities of solutions of the polymers in the solvent are derived. For polymers of the same chemical composition, one whose solution has a greater reduced viscosity has a higher molecular weight. Also, of two polymers having different reduced viscosities, when the polymers are dissolved in a solvent to form a solution of given concentration, that with the lower reduced viscosity gives a solution of lower viscosity. Hereinafter, the molecular weights of two polymers are compared on the basis of the reduced viscosities of their solutions as derived from viscosity data for a solution of 0.125 gram of polymer per 100 cc. of solution of the polymer in dimethyl formamide, employing Ostwald-Fenski tubes. The numerical values for reduced viscosities given herein are calculated using the equation:

$$\text{Reduced viscosity} = \frac{\text{time of efflux of solution-time of efflux of solvent}}{0.125 \times \text{time of efflux of solvent}}$$

Solution viscosities given herein are for solutions at about 40° C. measured by a Brookfield viscosimeter.

The molecular weight of a polymer is important in connection with many polymer uses, and particularly so when the polymer is to be dissolved in a solvent and the resulting solution used, for example, as a coating material or for casting films of the polymer. In preparing lacquers or other coating materials or in casting films from solutions, it is frequently desirable to have a high concentration of dissolved polymer in the solution used for these purposes and yet have the solution sufficiently fluid (suitably low viscosity) for the intended purpose. Conversely, in preparing solutions to contain a given concentration of polymer, it is frequently desirable to have a polymer which gives a solution of relatively low viscosity. In general, for solutions of polymers the solids content of the solution at a given viscosity is directly related to the molecular weight of the polymer. Thus, solutions of polymer prepared from a monomer or mixture of monomers, which solutions have a given viscosity, may contain quite different proportions of polymer to solvent, depending upon the molecular weights of the polymers. A decrease in the molecular weight of a polymer increases the concentration of the polymer which may be dissolved in a solvent to form a solution of given viscosity. It is, therefore, very desirable to be able to control the molecular weight of a polymer in polymerizing the monomers and to be able to produce a polymer of low molecular weight.

I have discovered that in copolymerizing acrylonitrile with methyl acrylate or other ester of acrylic acid and a normal aliphatic alcohol of the series methyl alcohol through n-nonyl alcohol in acidic (pH below 7.0), aqueous emulsions or suspensions of the monomers in an aqueous reaction mixture, with or without emulsifying or dispersing agent being present, employing hydrogen peroxide as a catalyst, the average molecular weight of the polymer as indicated by its reduced viscosity may be decreased by the presence in the reaction mixture in which the monomers are polymerized of a small amount of dissolved copper. My invention, therefore, comprises adding to such a reaction mixture a soluble copper salt and copolymerizing the monomers in the presence of dissolved copper in the reaction mixture in amounts effective to decrease the molecular weight of the resulting polymer. As little as 0.25 part per million (based on the total reaction mixture) dissolved copper is effective to decrease the molecular weight of the polymer. The process is applicable to copolymerizing the acrylonitrile and acrylic acid esters in widely different proportions. Thus, by my novel procedure mixtures of the monomers in the weight ratios of 25/75 to 90/10 parts of the acrylic acid ester/acrylonitrile may be reacted in the presence of the copper to form copolymers of low reduced viscosities.

My invention further extends to the preparation of solutions of the above-described polymeric acrylonitrile-acrylate esters of relatively low viscosities from the monomeric materials and a solvent for these polymers. The monomers are polymerized by the herein described procedure for controlling the molecular weight of the polymer and the resulting polymer of low molecular weight is dissolved in a solvent for the polymer to produce a solution of desired concentration having a relatively low viscosity.

In preparing copolymers of acrylonitrile with the acrylate esters from the monomers, the presence in the reaction mixture of more than a small amount (in terms of parts by weight per million) of copper salt exercises a marked inhibitory action on the polymerization reactions. The extent to which the reactions are inhibited depends both on the amount of copper and the amount of hydrogen peroxide catalyst present. In carrying out the process of my invention the amount of copper in the reaction mixture is insufficient to prevent the polymerization reactions taking place or to unduly slow down those reactions. On the other hand, sufficient copper is present to obtain a substantial decrease in molecular weight of the polymers. One-fourth part to 10 parts per million of copper present in the reaction mixture will effectively reduce the molecular weight of the polymers without excessively slowing up the polymerization reactions in the presence of suitable amounts of peroxide catalyst in the range of 0.1% to 6% $H_2O_2$ based on total monomers. The higher amounts of catalyst in this range are used to promote reaction when the larger amounts of copper are used. More than 10 parts per million of copper may be present in the reaction mixture, up to an amount which practically inhibits the polymerization reactions completely for a given concentration of peroxide catalyst. In some cases the presence of materials other than the monomers, peroxide catalyst and emulsifying or dispersing agent permit the addition of high amounts of copper such as would practically completely inhibit the polymerization in the absence of the added material. In general, however, preferred conditions of correlated amounts of copper and hydrogen peroxide present in the reaction mixture are 0.1% to 6% $H_2O_2$ of the total weight of monomers present, a minimum of about ¼ part per million dissolved copper, and a maximum of 6 parts per million dissolved copper for every 1% of $H_2O_2$ catalyst.

It sometimes happens that water suitable for use in preparing the aqueous reaction mixtures already contains some dissolved copper, the amount depending upon the particular source of the water and its treatment prior to use. Control of the amount of copper present in the reaction mixture to reduce the molecular weight of the polymer without unduly inhibiting the reaction rate may be obtained by adding any soluble copper salt to the reaction mixture to provide the desired content of dissolved copper. For example, cuprous or cupric chloride, cuprous cyanide or cupric sulfate may be dissolved in the reaction mixture to impart thereto the required concentration of dissolved copper.

The following examples and variations therein are illustrative of my invention. Parts given in these examples are parts by weight.

*Example 1.*—40 parts of methyl acrylate and 60 parts acrylonitrile are dispersed in 450 parts of distilled water free of copper containing a small amount of the dispersing agent having the reported composition

$C_{17}H_{33}CONHC_2H_4SO_3Na$ and marketed under the trade name Igepon T. The resulting acidic emulsion is heated to 70° C. and 0.0022 part copper sulfate pentahydrate (corresponding to 1.0 part per million copper based on the total weight of emulsion) and 1.0% $H_2O_2$ (in 28% hydrogen peroxide solution) based on the total monomeric methyl acrylate and acrylonitrile in the emulsion are added. The reaction mixture thus prepared is maintained at about 70° C. in an atmosphere of nitrogen while being moderately agitated for a period of seven hours. The resulting latex of copolymerized acrylonitrile-methyl acrylate is coagulated, washed and dried. By the described procedure an 89% yield of polymer (89 parts polymer from the 100 parts monomers) was obtained. The reduced viscosity of this polymer was 1.9. A 15% solution of this polymer in acetonitrile had a viscosity of 1,400 cps.

Under substantially identical conditions for polymerizing methyl acrylate and acrylonitrile as those of this example, except for omitting the copper sulfate, a yield of 84% of polymer of reduced viscosity of 6.1 was obtained. A 12% solution of this polymer in acetonitrile had a viscosity of 102,000 cps. Because of the higher concentration of polymer and lower viscosity of the solution in acetonitrile of polymer prepared by the above process of this example embodying my invention, that solution is particularly suitable for making films of the polymer by casting the solution and evaporating the solvent.

Adding cuprous cyanide or cupric chloride to the reaction mixture in place of the cupric sulfate to supply the 1 part per million dissolved copper in the reaction mixture, gave 85% and 83% yields, respectively, of polymers having reduced viscosities of 2.0. Thus, the presence of the copper in the polymerization procedure of this example resulted in a 67%–69% reduction in the viscosities of the polymers below that obtained with no copper present.

The following data show the effect of varying the quantities of copper salt and hydrogen peroxide catalyst in the procedure of the above example:

Increasing the amount of copper in the reaction mixture to 2 parts per million made no substantial change in the reduced viscosities of the polymers; i. e., polymer having a reduced viscosity of 1.9 was obtained employing 2 parts per million copper and 1% $H_2O_2$ based on the monomers. Decreasing the amount of hydrogen peroxide catalyst to 0.22% of the monomers gave polymers with reduced viscosities in the range 2.0 to 2.2 with 1 part per million copper present and a reduced viscosity of 3.2 with 0.5 part per million copper present. Increasing the hydrogen peroxide to 4.0% based on the monomers and employing 2 parts per million copper, a polymer having a reduced viscosity of 1.08 was obtained. Employing both 4 and 8 parts per million copper and 4% hydrogen peroxide catalyst, polymers with the same reduced viscosity of 0.91 were obtained.

In the above example and all the modifications of that example hereinbefore described, the weight ratio of monomeric acrylonitrile and methyl acrylate supplied to the reaction mixture was 60/40. The effect of the presence of dissolved copper in the reaction mixture in lowering the average molecular weight of the resulting polymers is, however, obtained over a wide range of monomer ratios; from 90 parts methyl acrylate to 10 parts by weight acrylonitrile to 25 parts methyl acrylate to 75 parts acrylonitrile. For example, employing a 30/70 ratio of methyl acrylate to acrylonitrile, 1% hydrogen peroxide catalyst and 1 part per million copper (other conditions being the same as described above for Example 1), a polymer having a reduced viscosity of 2.9 was obtained in 81% yield. Increasing the peroxide catalyst to 2.5% and the copper to 4 parts per million a polymer having a 2.3 reduced viscosity was obtained in 84% yield. A 12% solution of this polymer in acetonitrile had a viscosity of about 2100 cps. The data for these 30/70 polymers may be compared with a reduced viscosity of 5.5 and viscosity of 100,000 cps. for a 10% solution in acetonitrile of a 30/70 polymer prepared in like manner except for no copper being added to the reaction mixture. With a 60/40 ratio of methyl acrylate to acrylonitrile, .25% hydrogen peroxide catalyst and .25 part per million copper, a polymer having a reduced viscosity of 2.2 was obtained in 94% yield.

*Example 2.*—Octyl acrylate (40 parts) and acrylonitrile (60 parts) are dispersed in 450 parts water containing 1.6% of the above described dispersing agent known by the trade name Igepon T. The resulting acidic emulsion is heated to 70° C. and 2 p. p. m. copper added as copper sulfate pentahydrate and sufficient 28% hydrogen peroxide solution to provide 1% $H_2O_2$ based on the weight of the two monomers present. This reaction mixture is maintained at 70° C. for 22 hours in an atmosphere of nitrogen and with agitation. The polymer latex which forms is coagulated, washed and dried. By this procedure an 80% yield of polymer based on the starting monomers was obtained having a reduced viscosity of 1.7.

By repeating the procedure of this example, except for adding no copper to the reaction mixture in which the octyl acrylate and acrylonitrile are polymerized, polymer having a reduced viscosity of 2.1 was obtained. Thus a 19% reduction in reduced viscosity of the polymer was obtained by the use of the copper.

I claim:

1. In a process for copolymerizing an ester of acrylic acid and a normal aliphatic alcohol of the homologous series methanol through n-nonyl alcohol with acrylonitrile in an acidic, aqueous reaction medium containing separate monomer phase dispersed therein, in the presence of hydrogen peroxide as a catalyst for the polymerization reactions, that improvement which comprises preparing a reaction mixture containing a ratio, by weight, of 25/75 to 90/10 of the acrylic acid ester/acrylonitrile, to which is added hydrogen peroxide and a copper salt soluble therein as the sole material present which can act as a reducing agent, in amounts such that said reaction mixture initially contains about 0.1% to about 6% $H_2O_2$, based on the total ester and nitrile, at least ¼ part per million of dissolved copper and a maximum of 6 parts per million dissolved copper, by weight of the reaction mixture, for every 1% of $H_2O_2$ present, and copolymerizing said ester and nitrile in the presence of the dissolved copper.

2. The process of claim 1 in which the initial reaction mixture contains 0.22% to 4% $H_2O_2$ and 0.25 to 8 parts per million dissolved copper, with the copper not exceeding 6 parts per million for every 1% of $H_2O_2$ present.

3. The process of claim 1 in which the ester copolymerized with the acrylonitrile is methyl acrylate.

4. The process of claim 1 in which the ester copolymerized with the acrylonitrile is n-octyl acrylate.

5. The process of claim 2 in which the ester copolymerized with the acrylonitrile is methyl acrylate.

References Cited in the file of this patent

UNITED STATES PATENTS

| | | |
|---|---|---|
| 2,379,431 | Fryling | June 27, 1941 |
| 2,380,476 | Stewart | July 31, 1945 |
| 2,404,714 | Latham | July 23, 1946 |
| 2,412,034 | D'Alelio | Dec. 3, 1946 |
| 2,498,226 | Sully | Feb. 21, 1950 |

OTHER REFERENCES

Faraday Society Transactions, 1946, vol. 42, pages 156, and 675 to 684.